May 5, 1942.　　　　H. E. SMITH　　　　2,281,605
FLUID PRESSURE CONTROL DEVICE
Filed Feb. 7, 1939　　　2 Sheets-Sheet 1
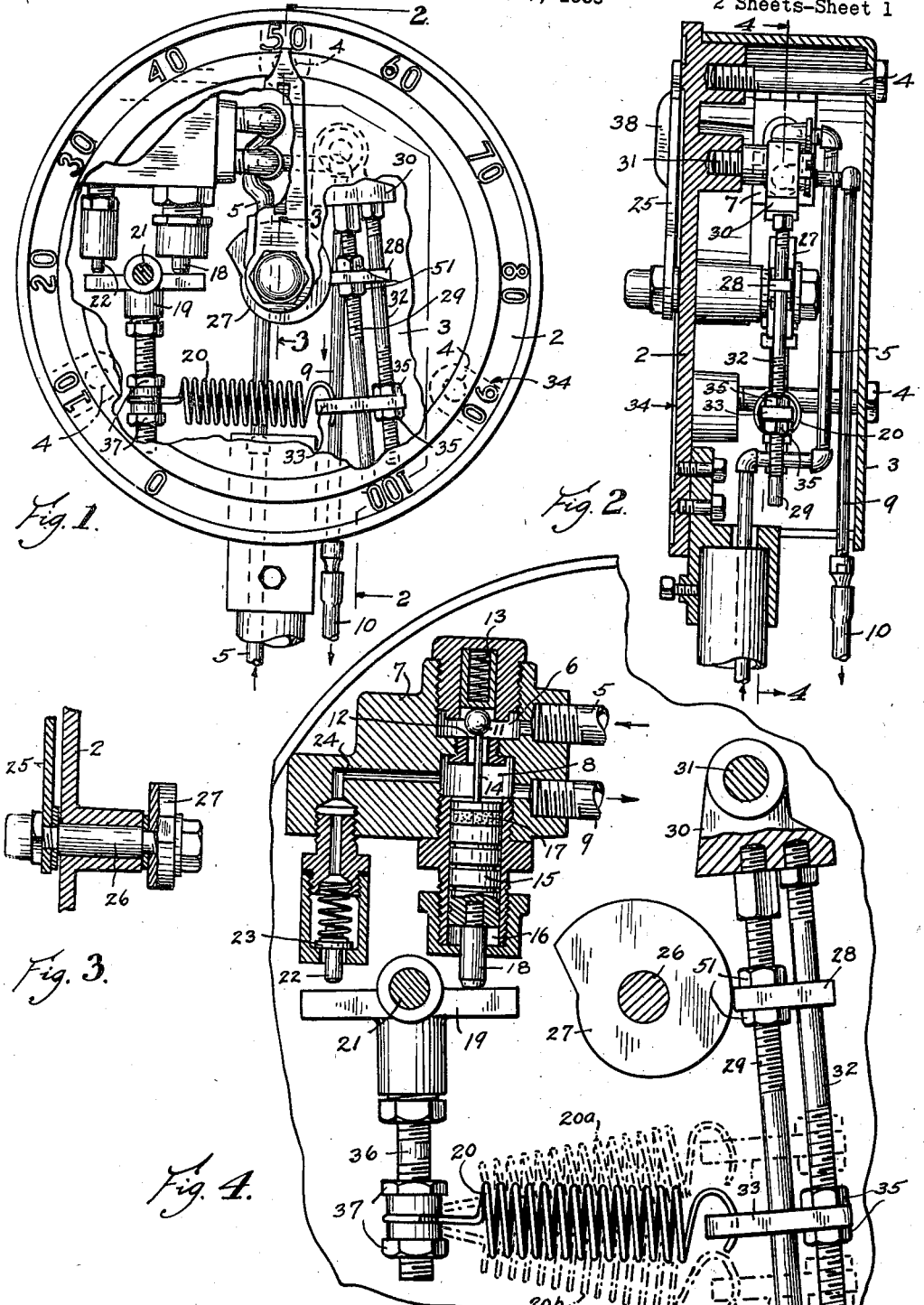

May 5, 1942.  H. E. SMITH  2,281,605
FLUID PRESSURE CONTROL DEVICE
Filed Feb. 7, 1939  2 Sheets-Sheet 2
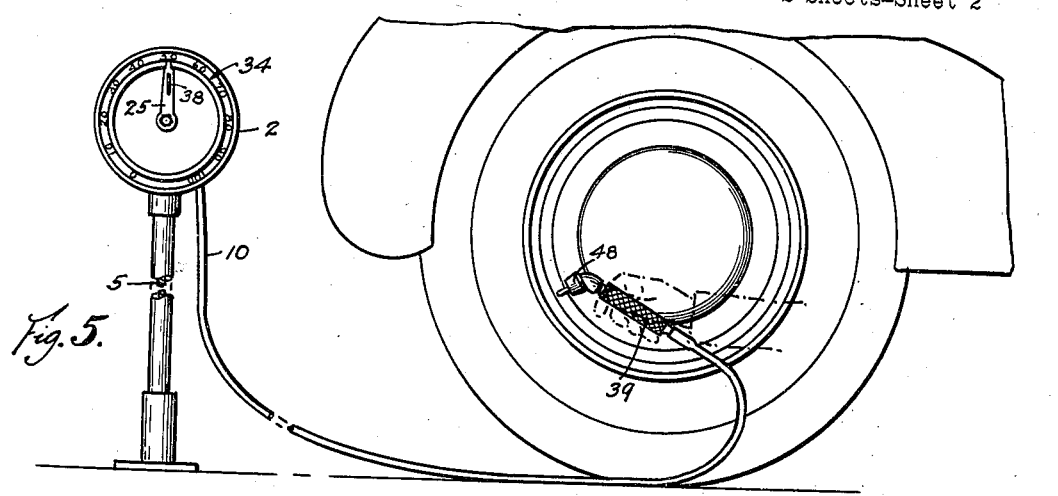
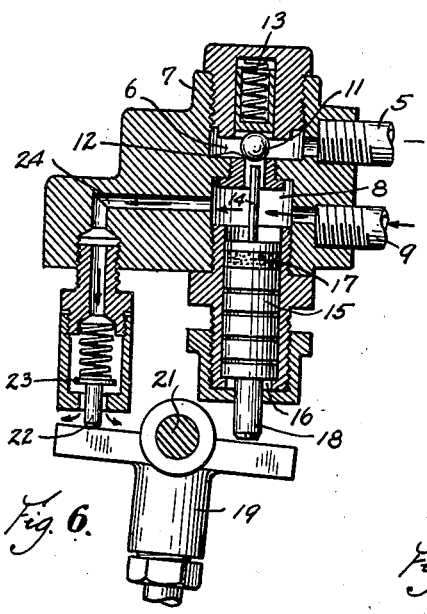
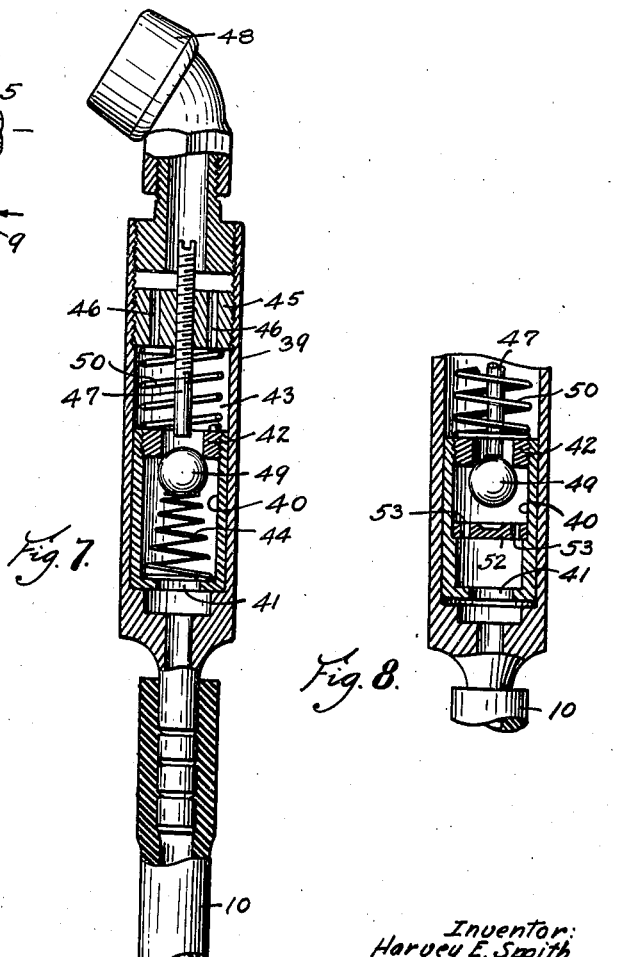
Inventor:
Harvey E. Smith
Attorney.

Patented May 5, 1942

2,281,605

UNITED STATES PATENT OFFICE 2,281,605

FLUID PRESSURE CONTROL DEVICE

Harvey E. Smith, Portland, Oreg., assignor to Albert Leslie Gordon, Portland, Oreg.

Application February 7, 1939, Serial No. 255,070

12 Claims. (Cl. 50—5)

My invention relates to the controlling of fluid pressure and it is particularly adapted to the automatic control of the pressure to which a pneumatic tire is inflated. It is desirable to have a dial of some kind which can be manually set at the pressure to which it is desired to inflate one or more tires, and thereafter to apply a hose to said tire either to inflate the same, if its pressure be below that indicated on the dial, or to deflate it in case its pressure be higher than that indicated by the dial. Devices intended to achieve this result have heretofore been constructed, but they have been subjected to the disadvantage that they have been inaccurate and also that they have been too slow in operation. It has required to much time to inflate a tire, and the pressure to which it was inflated has not been predeterminable with sufficient accuracy.

The principal object of my invention is to provide a pressure control device having a spring-controlled pressure regulator adapted to function so consistently that it can be calibrated and relied upon as an indicator of the pressure to which a tire is inflated. The adjustment of pressure regulators heretofore known has been inconsistent so that it has been necessary to utilize pressure gauges to determine the pressure to which the tire was inflated. With these devices, it has been necessary to use a gauge to adjust the pressure regulator, whereas I propose to calibrate the pressure regulator so that it will of itself indicate its proper adjustment. This makes unnecessary a separate pressure gauge, which is expensive and usually somewhat inaccurate. Another objection to the use of pressure gauges with devices of this type when used for inflating tires for customers of service stations arises from the fact that said pressure gauge will indicate a lower pressure during the time air is flowing into the tire than the final, predetermined pressure. This frequently misleads the customer into thinking that his tires are being inflated to a lower pressure than that requested.

A further object of my invention is to provide temperature compensating means to eliminate variations in the pressure to which a tire will be automatically inflated or deflated when the mechanism is at various temperatures with the dial set at the desired reading. I attain this object, for the most part, by means of a unique, adjustable compensating lever which, in conjunction with a control spring and valve lever, is adapted to compensate for the particular temperature effects that may arise with any specific design of pressure control device embodying my invention. It is desirable that said compensating means be adjustable to properly compensate errors arising from the use of various materials, as for example when the device may be mounted on either a brass or an aluminum member, or from the use of the device in various climates whose temperature range may vary widely. It is the purpose of my compensating means to eliminate any discrepancy that might otherwise exist due to temperature changes between the dial reading of my device and the pressure actually present in the tire with which it is used.

A further object of my invention is to provide means for rapidly inflating a tire to a predetermined pressure. Devices heretofore used to inflate a tire automatically to a predetermined pressure have been subject to the difficulty that, when said predetermined pressure is approached, the rate of flow of air into the tire has been so gradually reduced that it has taken an unduly long time to complete its inflation. I propose to accelerate said inflating process by eliminating the heretofore slow terminal portion thereof. I attain this result by providing a pulsating back pressure which is additive to the tire pressure. The tire is then inflated automatically to the difference between said back pressure and the pressure provided by the pressure control means, where inflation is halted abruptly instead of being prolonged.

A further object of my invention is to provide a calibrated pressure control device wherein the action of a control piston is regulated by a tension control spring. Devices heretofore known have utilized a compression spring for this purpose, and I have found that the friction of said compression spring rubbing on its housing has been a variable factor which has prevented the accurate calibration of the mechanism. It has been necessary to use a pressure gauge to determine the pressure to which a tire is inflated because of the unpredictable action of the compression spring, and it has been difficult in a practical design to construct a compression spring that would be positive in its action. If said compression spring has been adequately housed to prevent its buckling, it rubbed on the housing; whereas, if the housing were dispensed with to eliminate the rubbing, the spring has buckled in an uncertain way.

Other objects and advantages of my invention will be described in connection with the accompanying drawings in which—

Fig. 1 is a front elevation of a control device embodying my invention with a portion of the front panel thereof shown broken away to show the arrangement of the inner parts;

Fig. 2 is a vertical section taken substantially on the line 2—2 in Fig. 1;

Fig. 3 is a fragmentary vertical section taken substantially on the line 3—3 in Fig. 1;

Fig. 4 is an enlarged fragmentary section taken on the line 4—4 in Fig. 2, the front panel being shown broken away;

Fig. 5 is a more or less diagrammatic view of a control device embodying my invention together with a portion of an automobile whose tire is being serviced thereby;

Fig. 6 is a view of a portion of the structure shown in Fig. 4, some of the parts thereof being shown in a different operating position;

Fig. 7 is a sectional view of a signal which forms part of my invention; and

Fig. 8 is a fragmentary detail view of a modification of the signal shown in Fig. 7.

Most of the operating parts of a pressure control device embodying my invention may be mounted on a front panel 2 which I prefer to be cast of an aluminum alloy. Said parts may be protected by a back cover 3 fastened to front panel 2 by cap screws 4. A high-pressure pipe 5 is adapted to receive air, or other fluid, from any suitable compressor or storage tank and to conduct the same to chamber 6 of body member 7. Another chamber 8 within said body member may be connected to a tire, or other similar receptacle by filler pipe 9 and hose 10. Said chambers 6 and 8 are separated by a check valve 11 adapted to be held against seat 12 by spring 13 thereby normally to prevent air from flowing from said high pressure pipe to said filler pipe. Under certain conditions, however, said valve may be lifted by pin 14 thereby to permit said air to flow from pipe 5 to pipe 9 to inflate a tire. Said pin 14 is fixedly secured to piston 15 which fits snugly in cylinder 16 and is made substantially air-tight therein by leather packing member 17. Said piston carries a plunger 18 adapted to be lifted by T-lever 19 actuated by control spring 20.

The operation of the portion of my invention thus far described is as follows: Spring 20 acting through T-lever 19 and plunger 18 lifts piston 15 thereby causing pin 14 to open valve 11 and admit air under relatively high pressure into chamber 8 and filler pipe 9. When said filler pipe, or the tire or other receptacle connected thereto, becomes inflated to sufficient pressure, said pressure forces piston 15 down thereby allowing valve 11 to close, shutting off the air. It will be seen that the air pressure reached in said filler pipe will depend upon the tension of spring 20, and that said pressure may be varied by varying said tension.

In the event that a tire having greater pressure than that necessary to force piston 15 down against the tension of spring 20 is connected to filler pipe 9, said piston will be forced down past the aforesaid point where the air is shut off. Said piston will then cause T-lever 19 to further rotate about its pivot 21 and thus lift plunger 22 which is fixedly secured to release valve 23. Said release valve is connected to chamber 8 by passageway 24 so that, when said valve is opened, air is released from the over-inflated tire. Fig. 6 shows the mechanism in this position in which air is being released from a tire, while Fig. 4 shows it in the position in which air is allowed to flow into a tire from a high-pressure source.

As mentioned, the tension in spring 20 determines the pressure to which a tire will be inflated or deflated. To vary said pressure, said tension may be varied, and an indication of the tension in spring 20 will be an indication of the pressure to which the tire is to be inflated. To indicate the tension of spring 20, and to vary the same, I provide a pointer 25 fixedly secured to spindle 26 which carries a cam member 27 on its inner end. Said cam is adapted to bear against saddle member 28 adjustably secured to lever 29 which is fixedly secured to hub 30 pivotally mounted on front panel 2 by pin 31. Said saddle member is slidably mounted on lever 32, also fixedly secured to hub 30 and lying alongside lever 29. One end of spring 20 is hooked to lug 33 which is adjustably mounted on lever 32 and slidably mounted on lever 29. Thus force is applied by cam 27 to spring 20 through levers 29 and 32, and the angular position of said cam will determine said force, which is synonymous with the tension of said spring. Pointer 25 is adapted to indicate said tension on dial 34, which may be calibrated in pounds per square inch thereby to read directly the pressure to which a tire will be automatically inflated.

To compensate for the effect of expansion or contraction of the various parts of my invention when the temperature of said parts changes, I prefer to make lever 32 of some material such as an aluminum alloy which has a relatively large temperature coefficient of expansion. Thus when the mechanism is heated, the length of said lever will increase relative to the dimensions of other parts. In connection with said compensating means, the position of spring 20 is of importance, said spring being movable along lever 32 by nuts 35, and also along the shank 36 of T-lever 19 by nuts 37. This double adjustment makes it possible to keep spring 20 at equal angles with lever 32 and shank 36 to prevent longitudinal forces on either of these members, which longitudinal forces might, under certain circumstances, cause errors in operation. For example, a longitudinal force exerted on shank 36, in conjunction with the force normal thereto, would tend to rotate T-lever 19 in a different manner than if all of the force exerted by spring 20 were normal to said shank.

However, in some cases it may be desirable to have spring 20 at different angles with respect to lever 32 and shank 36. It will be seen that, with said spring at the position shown by dotted lines at 20a in Fig. 4, the aforesaid elongation of lever 32 will diminish the tension on said spring; whereas with said spring in the position shown by dotted lines at 20b, said elongation of lever 32 would increase the tension in spring 20. It will thus be seen that my compensating means is adapted to compensate for the over-all result of whatever temperature effects may be present in the mechanism, and that said compensation may be adjusted to suit various materials that may be used. For example, I have described my invention as including an aluminum alloy front panel on which the various parts are mounted. However, it might be desirable to mount said parts on a brass member, thus altering the differential expansion and contraction, and it might be desirable to be able to mount said parts on either brass or aluminum members.

To adjust my compensating means, I prefer to attach a standard pressure gauge at the position normally occupied by a tire. The pressure control device comprising my invention may then be set for some pressure, such for example as 50 pounds per square inch, at the lowest temperature available. The gauge reading may then be adjusted to 50 pounds per square inch by moving spring 20 laterally of itself, along lever 32 and shank 36. It will be understood that, although I have hereinbefore described the tension in spring 20 as controlling the pressure to which a tire will be inflated, the effect of said tension may be varied by varying the length of the lever to which it is applied, and I prefer to make use of this feature in adjusting the calibration of my indicator rather than to vary the tension of the spring itself. A still finer adjustment may be made by moving saddle 28 by means of nuts 51.

The mechanism comprising my invention should then be heated to the highest temperature at which it will be operated, and any deviation of the gauge reading from its previous value should be compensated by the large relative elongation of lever 32. If said gauge reading increases with an increase in temperature, spring 20 may be moved to a position such as 20a; while if said gauge reading decreases with an increase in temperature, said spring may be moved to a position such as 20b. The lateral position of said spring may be corrected to maintain the correct pressure at the lower temperature.

In inflating an automobile tire with the apparatus hereinbefore described, the pointer should be set to the desired pressure by hand. For this purpose, a handle 38 is provided on said pointer. Then the hose should be connected to the tire for sufficient time to allow the pressure in said hose to build up until the air supply is shut off by said pressure acting on piston 15, as hereinbefore described. In order that the attendant may know when this operation is completed, it is desirable that some form of signal be provided to operate when air is flowing into the tire, and to cease operation when said air flow ceases. To this end, I provide a signal 39 which I prefer to place at the tire end of hose 10, although it may be placed elsewhere if desired.

A hollow piston 40 having a hole 41 in one end and a seat 42 threaded in the other end is adapted to slide freely in cylinder 43, but to fit sufficiently tight therein that substantially no air will leak around said piston. Within said piston, a ball valve 49 is held against said seat 42 by a very light spring 44. Air coming through hose 10 under pressure will move said piston in said cylinder until pin 47 strikes ball 49 and lifts it from its seat. Then air will flow freely through said signal and enter the tire through chuck 48, which may be of any suitable type. However, when said air flow begins, the pressure against piston 40 decreases, and spring 50 thrusts said piston 40 backward against said pressure and allows valve 49 to close. This permits said air pressure to build up again, and the cycle is repeated continuously. This vibration of piston 40 gives an audible signal as long as air is flowing into the tire, or said vibrations may be felt in the hose if the signal is located elsewhere than at the end thereof. I prefer to thread pin 47 into a plug 45 having holes 46, said plug being threaded in cylinder 43. The tension produced in spring 50 by piston 40 before pin 47 strikes ball 49 may then be adjusted by screwing said pin 47 in or out of plug 45, thus adjusting the frequency of said vibrations.

I have described a signal comprising part of my invention as having a very light spring 44 adapted to hold ball 49 in place, and I deem it important that said spring be as light as possible in order that air may be withdrawn from an over-inflated tire accurately to the pressure indicated. However, under many circumstances I have found that I can dispense with said spring 44 and thus secure a substantially different and improved mode of operation. This modification of my invention is illustrated in Fig. 8, wherein no spring 44 is provided. In this case, it is necessary that the movable piston 40 be sufficiently light in weight that it will be readily moved by the air stream, and that sufficient air pressure be used to close the ball valve without the aid of a spring.

The operation of this improved signal is unique in that the ball 49 merely rests on pin 47 while piston 40 vibrates, thus opening and closing the valve. The significance of this mode of operation is that the valve remains open longer and thus results in a more rapid inflation of the tire even when the cut-off pressure is closely approached. The ball valve does not re-seat itself, after being opened, until the air pressure on it has been substantially reduced, whereas, if spring 44 were used, it would tend to close said valve more rapidly. Moreover, spring 44 would cause piston 40 to move far enough to move ball 49 off pin 47, and it would then require more time for the valve to open, that is, it would remain closed for a greater proportion of the time. On the other hand, with the structure illustrated in Fig. 8, spring 50 may be designed to have a limited effective travel so that the valve will close without moving ball 49 off pin 47, or with a very slight movement of said ball from said pin, and said valve will therefore be in a position immediately to open again. It will be noted that, to accomplish my purpose, it is not necessary that the valve comprising ball 49 and seat 42 remain closed for any particular length of time; it is necessary merely that it close occasionally in order that it may remain closed when the differential pressure between chamber 8 and the tire being inflated becomes less than a predetermined value herein referred to as back pressure. I provide a spider 52 to prevent ball 49 obstructing the reverse flow of air from an over-inflated tire. Said spider is provided with holes 53 which cannot be closed by said ball.

It will be apparent that this type of signal will not interfere with the withdrawing of air from an over-inflated tire, since the pressure of the air in said tire will readily move valve 49 from its seat and it may then pass on through the hose.

I am aware that the signals of this type, as well as other types, have heretofore been used for the purpose already described, that is, to inform the attendant when the inflating operation was completed. I am aware also that said signals have heretofore produced more or less back pressure in the hose, and that a steady back pressure might be produced by some other obstruction in said hose. However, I have found that by deliberately increasing the pulsating back pressure produced by my signal beyond that ordinarily used for signalling purposes, and using said pulsating back pressure in connection with the pressure control device hereinbefore described, I am able to inflate a tire much more rapidly than with any automatic device heretofore known to me.

To accomplish this result, I prefer to make spring 50 of sufficient strength to require about 40 pounds per square inch air pressure, although it may be more or less, in the hose to move valve 49 from its seat. With this arrangement, spring 20 will cause valve 11 to close when the air in chamber 8 is at a pressure 40 pounds per square inch in excess of that in the tire, but dial 34 may nevertheless be calibrated to read the tire pressure, if desired. The advantage of this construction lies in the fact that, during the intervals in which valve 49 is open, air will flow into the tire at considerable pressure even when the cut-off point is closely approached, whereas without said back pressure, said air would flow under a gradually diminishing differential pressure.

It has heretofore been supposed that it was necessary to minimize any pulsation that might be set up by a signal because the vibration therefrom would adversely affect some part of the control mechanism. For example, if a pressure gauge were used, the pressure-responsive element thereof would be continually flexed and unflexed, and this unnatural action would soon wear it out. Or if a diaphragm were used in the pressure control mechanism, it would similarly be damaged by its continual motion. However, in the pressure control means herein described, there is neither a diaphragm nor a pressure gauge nor any other part that will be damaged by vibration, and I can therefore use sufficient pulsating back pressure to effectively decrease the time required to inflate a tire. Said pulsations of the air pressure are applied directly to whatever form of valve may be used in the control mechanism, and said valve may thereby be caused to chatter, resulting in unsatisfactory operation of said control mechanism. I have found that said chattering may be prevented by increasing the inertia of said valve. However, it is undesirable to make said valve itself sufficiently massive. I therefore provide T-lever 19 operatively connected to valve 11 and having shank 36 whose inertia is effectively magnified by being located on a substantial lever arm, thereby to prevent chattering of said valve or of piston 15.

By way of example of the operation of my invention, suppose that a tire is to be inflated to a pressure of 50 pounds per square inch, and that the vibrating signal is adjusted to require 40 pounds per square inch pressure to open the valve therein. The pointer should be set to a dial reading of "50," whereupon air will be admitted to chamber 8 from a suitable high pressure supply. When the tire has been inflated, to say, 48 pounds per square inch pressure, the maximum pressure to be overcome by the control means will be 88 pounds per square inch. As a result of the aforesaid dial setting, a pressure of 90 pounds per square inch will be reached in said chamber before cutting off. There will then be not more than two pounds per square inch differential pressure tending to cause air to flow into the tire when valve 49 is closed, but when said valve is open substantially all of the back pressure will be eliminated and air will flow into the tire at a differential pressure of about 42 pounds per square inch. However, when the pressure in the tire reaches 50 pounds per square inch, valve 49 will no longer be opened and the inflation of the tire will cease abruptly.

A further advantage of my invention over those devices heretofore used that employ a pressure gauge, arises from the necessity of releasing air from said prior devices when a lower pressure is desired in order to reduce the gauge reading. With my invention, said pressure is automatically reduced when the pointer is moved to a lower reading, that is, the pressure in the hose is automatically maintained at a value exceeding the dial reading by a fixed amount, depending upon the adjustment of the signal, regardless of which way the pointer of said dial is moved.

While my invention is particularly directed to the rapid inflation of tires in service stations, accuracy is of great importance since the life of a tire is much longer if pressure be kept accurately at the correct value. My invention is adapted to give more accurate results than any other automatic device with which I am familiar, and it will give more accurate tire pressures than are ordinarily secured by hand filling because of the care required for accurate results by the latter method. However, I do not wish to limit the use of my invention to the inflation of automobile tires since it will obviously be useful for securing a desired fluid pressure in other containers.

I claim:

1. In a fluid regulator for fluid comprising a fluid inlet, a fluid outlet, a port lying intermediate said fluid inlet and said fluid outlet and a valve element controlling the flow of fluid through said port, resilient means for opening and closing said valve element, a heat responsive pivoted lever for varying the effectiveness of the force exerted by said resilient means, and means for adjustably rotating said lever about its pivot to vary the force exerted by said resilient member.

2. The structure set out in claim 11 modified by said anchoring device being elongated and being inclined obliquely to said actuating member and comprising a guide, and having a heat responsive element and a spring carrier slidably mounted on said guide and secured to said heat responsive element to vary the effective distance of the spring connection from the pivot of said anchor.

3. A pressure regulator for fluid comprising a casing, a fluid inlet, a fluid outlet, a port lying intermediate said fluid inlet and said fluid outlet, a valve element controlling the flow of fluid through said port, said parts being housed within said casing, one face of said casing carrying a calibrated scale, a pointer adapted to register with said scale, a pressure responsive control element operatively connected to said pointer for seating and unseating said valve element, a waste discharge passageway in open communication with said fluid outlet and a valve controlling the flow of fluid therethrough, said waste discharge valve and said closure control element being arranged in predetermined relation, one with the other, an actuating lever selectively operable to operatively engage one of said latter devices and to disengage the other, yieldable resilient means directly secured to said actuating means normally positioned to tend to hold said actuating means in engagement with the port valve control element, a movable anchoring device for regulating the effective yield point of said resilient means, and means operatively connected to said pointer for moving said anchoring device for varying the effective yield point of said resilient means.

4. A pressure regulator for fluid comprising a casing, a fluid inlet, a fluid outlet, a port lying intermediate said fluid inlet and said fluid outlet, a valve element controlling the flow of fluid through said port, said parts being housed within said casing, one face of said casing carrying a calibrated scale, a pointer adapted to register with said scale, a pressure responsive control element operatively connected to said pointer for seating and unseating said valve element, a waste discharge passageway in open communication with said fluid outlet and a valve controlling the flow of fluid therethrough, said waste discharge valve and said closure control element being arranged in predetermined relation, one with the other, an actuating lever selectively operable to operatively engage one of said latter devices and to disengage the other, yieldable resilient means directly secured to said actuating means, normally positioned to tend to hold said actuating means in engagement with the port valve control element, a movable anchoring device for regulating the effective yield point of said resilient means, and a helical cam operatively connected to said pointer for moving said anchoring device for varying the effective yield point of said resilient means.

5. A pressure regulator for fluids, comprising a head defining a fluid inlet, a fluid outlet, a port lying intermediate said fluid inlet and outlet, and a waste discharge passageway leading from said fluid outlet, a spring closed valve element controlling the flow of fluid through said port, a pressure responsive control element for seating and unseating said valve element, a shaft journaled in said head with one end protruding axially outwardly through one end of said head, an indicating scale arranged upon the outer end of said head and encircling said protruding shaft, a pointer carried by said shaft and being movable over and registering with said scale, an actuating member pivotally mounted intermediate its ends with one end thereof operable to engage said pressure responsive control element, resilient means in tension secured to said member to tend to rotate it about its pivot so that the end engaging said control element will be engaged, and manual means for varying the degree of tension exerted by said resilient means upon said member, said manual means being operatively connected to said journaled shaft and said shaft constituting the agency through which said resilient tension is varied, whereby said actuating member can be adjusted to yield in the presence of fluid pressure within said fluid outlet and to close the valve over said port.

6. A pressure regulator for fluids, comprising a head defining a fluid inlet, a fluid outlet, a port lying intermediate said fluid inlet and outlet, and a waste discharge passageway leading from said fluid outlet, a spring closed valve element controlling the flow of fluid through said port, a pressure responsive control element for seating and unseating said valve element, a normally closed valve for controlling the flow of fluid from said waste discharge passageway, a shaft journaled in said head with one end protruding axially outwardly through one end of said head, an indicating scale arranged upon the outer end of said head and encircling said protruding shaft, a pointer carried by said shaft and being movable over and registering with said scale, an actuating member pivotally mounted intermediate its ends with one end thereof operable to engage said waste discharge valve and with the other operable to engage said pressure responsive control element, resilient means in tension secured to said member to tend to rotate it about its pivot so that the end engaging said control element will be engaged, and manual means for varying the degree of tension exerted by said resilient means upon said member, said manual means being operatively connected to said journaled shaft and said shaft constituting the agency through which said resilient tension is varied, whereby said actuating member can be adjusted to yield in the presence of fluid pressure within said fluid outlet and to close the valve over said port and further to yield and unseat the waste discharge valve in the presence of greater fluid pressures to permit said excess pressures to be dissipated through said waste discharge passageway.

7. In a pressure regulator for fluid comprising a fluid inlet, a fluid outlet, a port lying intermediate said fluid inlet and said fluid outlet, a valve element for controlling the flow of fluid through said port, a shank for said valve element, a lever adapted to change in length with change in temperature in a related and predetermined amount different from that of said shank, and resilient means operatively connected at one of its ends to said shank and connected at its other end to said lever, whereby changes in temperature produce predetermined changes in the direction in which said resilient means exerts its force.

8. In a pressure regulator for fluid comprising a fluid inlet, a fluid outlet, a port lying intermediate said fluid inlet and said fluid outlet, a valve element for controlling the flow of fluid through said port, resilient means for opening and closing said valve element, and a heat responsive lever for varying the effective force exerted by said resilient element, said lever being adapted to vary the direction of action of said resilient means when the temperature of said lever changes.

9. A pressure regulator for fluid comprising a fluid inlet, a fluid outlet, a port lying intermediate said fluid inlet and said fluid outlet, an inlet valve controlling the flow of fluid thru said port and adapted to be closed by fluid pressure in said fluid inlet, a pressure responsive control element for unseating said inlet valve, a waste discharge passageway in unrestricted communication with said fluid outlet, a waste valve adapted to be closed by fluid pressure in said fluid outlet, and controlling the flow of fluid thru said waste discharge passageway, said control element including a lever, said control element being adapted and arranged to be disengaged operatively from the inlet valve and to engage and unseat said waste valve when the pressure in said outlet exceeds a predetermined value and to be disengaged operatively from the waste valve and to unseat said inlet valve when said pressure is less than said predetermined value, yieldable resilient means secured to said lever and being normally positioned to tend to unseat said inlet valve, a movable anchoring device for regulating the effective yield point of said resilient means, and means for moving said anchoring device for varying the effective yield point of said resilient means.

10. A pressure regulator for fluid comprising a fluid inlet, a fluid outlet, a port lying intermediate said fluid inlet and said fluid outlet, an inlet valve controlling the flow of fluid thru said port and adapted to be closed by fluid pressure in said fluid inlet, a pressure responsive control element for unseating said inlet valve, a waste discharge passageway in unrestricted communication with said fluid outlet, a waste valve adapted to be closed by fluid pressure in said fluid outlet, and controlling the flow of fluid thru said waste discharge passageway, said control element including a lever, said control element being adapted and arranged to be disengaged operatively from the inlet valve and to engage and unseat said waste valve when the pressure in said outlet exceeds a predetermined value and to be disengaged operatively from the waste valve and to unseat said inlet valve when said pressure is less than said predetermined value, yieldable resilient means secured to said lever and being normally positioned to tend to unseat said inlet valve, a pivoted anchoring device for regulating the effective yield point of said resilient means, and means for moving said anchoring device about its pivot for varying the effective yield point of said resilient means.

11. A pressure regulator for fluid comprising a fluid inlet, a fluid outlet, a port lying intermediate said fluid inlet and said fluid outlet, an inlet valve controlling the flow of fluid thru said port and adapted to be closed by fluid pressure in said fluid inlet, a pressure responsive control element for unseating said inlet valve, a waste discharge passageway in unrestricted communication with said fluid outlet, a waste valve adapted to be closed by fluid pressure in said fluid outlet, and controlling the flow of fluid thru said waste discharge passageway, said control element including a lever, said control element being adapted and arranged to be disengaged operatively from the inlet valve and to engage and unseat said waste valve when the pressure in said outlet exceeds a predetermined value and to be disengaged operatively from the waste valve and to unseat said inlet valve when said pressure is less than said predetermined value, a tension spring secured to said lever and being normally positioned to tend to unseat said inlet valve, a movable anchoring device for engaging the opposite end of said tension spring and means for moving said anchoring device for varying the effective tension of said spring.

12. A pressure regulator for fluid comprising a fluid inlet, a fluid outlet, a port lying intermediate said fluid inlet and said fluid outlet, an inlet valve controlling the flow of fluid thru said port and adapted to be closed by fluid pressure in said fluid inlet, a pressure responsive control element for unseating said inlet valve, a waste discharge passageway in unrestricted communication with said fluid outlet, a waste valve adapted to be closed by fluid pressure in said fluid outlet, and controlling the flow of fluid through said waste discharge passageway, said control element including a T-shaped lever for seating and unseating said waste valve at opposite throws of said lever, said control element being adapted and arranged to be disengaged operatively from the inlet valve and to engage and unseat said waste valve when the pressure in said outlet exceeds a predetermined value and to be disengaged operatively from the waste valve and to unseat said inlet valve when said pressure is less than said predetermined value, yieldable resilient means secured to said lever and being normally positioned to tend to unseat said inlet valve, a movable anchoring device for regulating effective yield point of said resilient means, and means for moving said anchoring device for varying the effective yield point of said resilient means.

HARVEY E. SMITH.